US008085990B2

(12) United States Patent
Ofek

(10) Patent No.: US 8,085,990 B2
(45) Date of Patent: Dec. 27, 2011

(54) HYBRID MAPS WITH EMBEDDED STREET-SIDE IMAGES

(75) Inventor: Eyal Ofek, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/900,635

(22) Filed: Oct. 8, 2010

(65) Prior Publication Data

US 2011/0018902 A1 Jan. 27, 2011

Related U.S. Application Data

(63) Continuation of application No. 11/460,878, filed on Jul. 28, 2006, now Pat. No. 7,840,032.

(51) Int. Cl.
*G06K 9/00* (2006.01)
*G06K 9/36* (2006.01)
*G06K 9/32* (2006.01)
*G09G 5/00* (2006.01)
*H04N 9/74* (2006.01)

(52) U.S. Cl. ........ 382/113; 382/276; 382/284; 382/294; 345/629; 345/630; 345/631; 345/632; 345/633; 345/634; 345/635; 345/636; 345/637; 345/638; 345/639; 345/640; 345/641; 348/584; 348/585; 348/586; 348/587; 348/588; 348/589; 348/590; 348/591; 348/592; 348/593; 348/594; 348/595; 348/596; 348/597; 348/598; 348/599; 348/600; 348/601

(58) Field of Classification Search ........................ None
See application file for complete search history.

(56) References Cited

U.S. PATENT DOCUMENTS

| 5,815,411 | A | * | 9/1998 | Ellenby et al. ................. 702/150 |
| 6,222,555 | B1 | * | 4/2001 | Christofferson et al. ..... 345/428 |
| 6,223,523 | B1 | * | 5/2001 | Frutschi .......................... 60/775 |
| 7,096,428 | B2 | | 8/2006 | Foote et al. |
| 2002/0140988 | A1 | * | 10/2002 | Cheatle et al. ................. 358/402 |
| 2003/0128182 | A1 | * | 7/2003 | Donath et al. ................. 345/156 |
| 2003/0151592 | A1 | | 8/2003 | Ritter |
| 2004/0257375 | A1 | * | 12/2004 | Cowperthwaite ............. 345/582 |
| 2006/0063599 | A1 | * | 3/2006 | Greenspan ........................ 473/1 |
| 2011/0173565 | A1 | * | 7/2011 | Ofek et al. ..................... 715/790 |

OTHER PUBLICATIONS

Zheng, Pamoramic Representation of Scenes for Route Understanding, 1990 IEEE p. 161-167.*
Final Office Action mailed Jan. 26, 2011 in U.S. Appl. No. 11/465,500, 18 pages.
Non-Final Office Action mailed May 24, 2011 in U.S. Appl. No. 11/465,500. 19 pages.

* cited by examiner

*Primary Examiner* — Michelle Entezari
(74) *Attorney, Agent, or Firm* — Shook Hardy & Bacon LLP

(57) ABSTRACT

The claimed subject matter relates to a computer-implemented architecture that can generate a map. The map can be a hybrid between an orthographic projection map and street-side images, thus including useful aspects from both types of representations. For example, an orthographic projection map is very effective at presenting global relationships among the features of the map but not effective at presenting local detail. In contrast, street -side images show excellent detail but do not convey the global information of an orthographic projection map. The hybrid map can thus provide a richer set of information than conventional maps and can also display objects/features of the hybrid map in multiple perspectives simultaneously on a single representation that is printable.

20 Claims, 14 Drawing Sheets

FIG. 12A – PRIOR ART
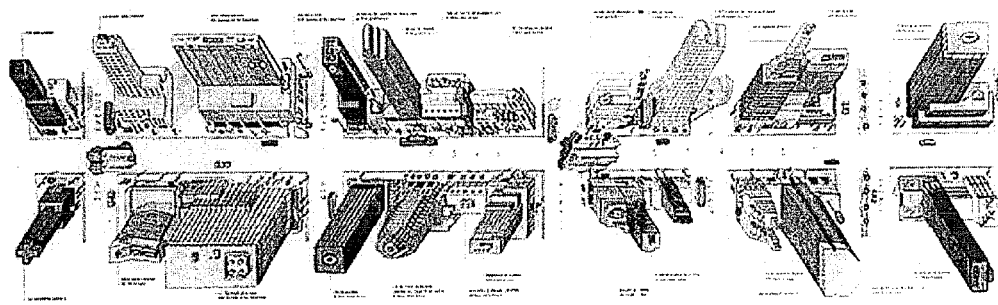
FIG. 12B – PRIOR ART

HYBRID MAPS WITH EMBEDDED STREET-SIDE IMAGES

CROSS-REFERENCE TO RELATED APPLICATIONS

This application is a continuation of, and claims priority to, U.S. patent application Ser. No. 11/460,878, filed on Jul. 28, 2006 and titled "STREET-SIDE MAPS AND PATHS," the teachings of which are incorporated herein by reference. This application is related to: U.S. Pat. No. 7,499,586, issued Mar. 3, 2009 and titled "PHOTOGRAPHING BIG THINGS;" U.S. Pat. No. 7,634,465, issued Dec. 15, 2009 and titled "INDEXING AND CACHING STRATEGY FOR LOCAL QUERIES;" and co-pending U.S. patent application Ser. No. 11/465,500, filed Aug. 18, 2006 and titled "USER INTERFACE FOR VIEWING STREET SIDE IMAGERY." The entireties of these applications are incorporated herein by reference.

BACKGROUND

Maps have been in existence for many thousands of years and employed for a variety of purposes relating to travel, logistics, planning, etc. One type of map is a general purpose map, which typically provides an orthographic projection of a surface (e.g., the surface of the Earth or another celestial body) or simply the top-down view of an orthographic projection of an object (e.g., the layout of a large building . . . ). As such, general purpose maps can provide useful information that can aid in understanding or quickly referencing how various features on the map relate to one another in terms of distance, direction, orientation, size etc.

In addition, the concept of an orthographic projection map (e.g., a general purpose map) can be augmented in a variety of ways to provide more specialized maps. For example, a road map is designed such that roadways or paths of a surface are the central features. On the other hand, a physical map generally focuses on landforms and bodies of water and often employs lines, shading, tints, spot elevations and colors to show elevation and distinguish mountains from lowlands. Of course, there are many other specialized maps based upon the concept of an orthographic projection, such as political maps, relief maps, topographical maps and the like, and each can provide specialized information.

However, regardless of the type of map employed, there are certain trade-offs between what information will be provided to the viewer versus what information will be omitted. Often these trade-offs are inherent in the map's construction parameters. For example, whereas a physical map may be more visually appealing, a road map is more useful in, e.g., assisting travel from one point to another over common routes. Sometimes, map types can be combined such as a road map that also depicts land formation, structures, etc. However, when the purpose of the map is to assist travel, certain other information, such as, e.g., political information may not be of much use. Thus, incorporating this information may detract from utility of the map. Accordingly, a good map is one that provides the viewer with useful information, but not so much that extraneous information detracts from the experience.

Another way of depicting a certain location that is altogether distinct from orthographic projection maps is by way of first-person perspective. Often this type of view is from a ground level, typically represented in the form of a photograph, drawing, or some other image of a feature as it is seen in the first-person. First-person perspective images, such as "street-side" images, can provide many local details about a particular feature (e.g., a statue, a house, a garden, or the like) that conventionally do not appear in orthographic projection maps. As such, street-side images can be very useful in determining a location based upon a particular point-of-view because a user can be directly observing a corporeal feature (e.g., a statue) that is depicted in the image. In that case, the user might readily recognize that the corporeal statute is the same as that depicted in the image, whereas with an orthographic projection map, the user might only see, e.g., a small circle that represents the statute that is otherwise indistinguishable from many other statutes similarly represented by small circles.

However, while street-side images are very effective at supplying local detail information such as color, shape, size, etc., they do not readily convey the global relationships between various features resident in orthographic projection maps, such as relationships between distance, direction, orientation, etc. Accordingly, current approaches to street-side imagery/mapping have many limitations. For example, conventional applications for street-side mapping employ an orthographic projection map to provide access to a specific location then separately display first-person images at that location. That is, a user can select a point from an orthographic projection map, and then be served local, first-person images of the selected location. As such, many difficulties arise.

For example, it is often difficult to orient the displayed, local images with the global, orthographic projection map. Hence, while the user might easily match an image with the corporeal feature(s) she is currently viewing (or remembers from past experience), she must mentally translate the orientation of the image to know, e.g., that turning left is equivalent to heading north on the global map. Often, this can lead to confusion for the user. Similarly, as well as trouble in obtaining the global orientation, there also exists trouble obtaining the global position when browsing the local images. For instance, a user might want take a particular path because the local images show it has, e.g., more shade, more shops or the like, but may not be able to readily identify which side of the street those images portray.

Additionally, the first-person images provide only localized information based upon a selected position, which makes searching or exploration very expensive/inefficient in terms of time and image queries. For instance, if a user knows exactly where to look on the global map, then clicking at that location will serve up the desired local image. However, if the user does not know the exact location, but rather only knows the general whereabouts of a particular feature on the global map, then searching and/or exploring for that particular feature can be a very lengthy process. Furthermore, conventional applications for street-side imagery are interactive solutions and require constant access to new local images whenever the user wants to see local information from a different point. Hence, there is no convenient way to print the full information necessary for a larger area such as a city block, a neighborhood or an entire city. Therefore, in many circumstances, the user must have wireless access and appropriate equipment to display the local images in order to take full advantage of these services.

Accordingly, there is a need in the street-side imagery and mapping space for a solution that can provide local images in connection with global map information. And, further, that can mitigate the difficulties associated with mental translations between the images and the map, make searching for particular features or areas more efficient, and also be capable of delivering this information in a compact manner that can be printed, and thus available to a traveler without the need for special equipment.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The claimed subject matter disclosed and claimed herein, in one aspect thereof, comprises system that can provide local information about an object at or near a feature on a global map. To the accomplishment of the foregoing and other related ends, a hybrid map can be generated that includes useful features of local images as well as those from orthographic projection maps. For example, local or street-side images that contain specific local details such as appearance, color, shape, etc. can be inserted and/or interpolated into an orthographic projection map, which itself provides useful global context such as orientation, size, distance, direction, etc. conventionally lacking in local images.

In particular, the system can include a global map (typically an orthographic projection map) consisting of a feature at a feature position, as well as a local image (typically a ground-level, first-person perspective image) of the feature, or objects and/or a scene visible from the feature position. For example, if the feature on the global map is a garden, then the local image can be a photograph or some other rendering of the garden. Additionally or alternatively, if the feature is a road, then the local image can contain an object or a scene that is visible from the road (e.g., the position of the feature/road on the global map). In accordance therewith, the system can also include an interpolation component that embeds the local image in the global map to produce the hybrid map.

The interpolation component can embed the local image at or near the feature position and can determine the orientation of the local image, the display style to be used, the importance of a local image (or an object therein), and/or the like. In accordance with one aspect of the claimed subject matter, images (or objects therein) can be emphasized or de-emphasized based upon the importance. For example, important local images can be emphasized by increasing their size, changing the contrast, highlighting, and/or the like. Less important images can be de-emphasized in a similar manner or suppressed from the hybrid map altogether. Whether a particular local image (or object) is important can depend upon user preferences or other factors. For instance, a user that is exploring an area might want detailed information on all nearby points of interest. In contrast, a traveler traveling along a planned route may only be interested in images at or near junctions where the route changes course.

In accordance with another aspect of the claimed subject matter, the local images can be single images, three-dimensional models, panoramas, or combinations thereof. In addition, the local image can include a hyperlink that provides further information about the local image itself, an object in the local image, the feature, the feature position, and/or an object at or near the feature position. Furthermore, the local images can depict objects in the scene from different directions. Thus, local images can be arranged on the hybrid map such that multiple perspectives of one or many objects can be visible simultaneously. As such, the hybrid map can provide a single, printable representation of an area, complete with information that conventionally requires many different representation and/or multiple queries/requests.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

BRIEF DESCRIPTION OF THE DRAWINGS

FIG. 12A is a prior art map of ancient Jerusalem that depicts the use of perspective from a single point-of-view;

FIG. 12B is a prior art map of a contemporary city that depicts three-dimensional perspective of buildings from a dominant point-of-view;

DETAILED DESCRIPTION

Figure 1:
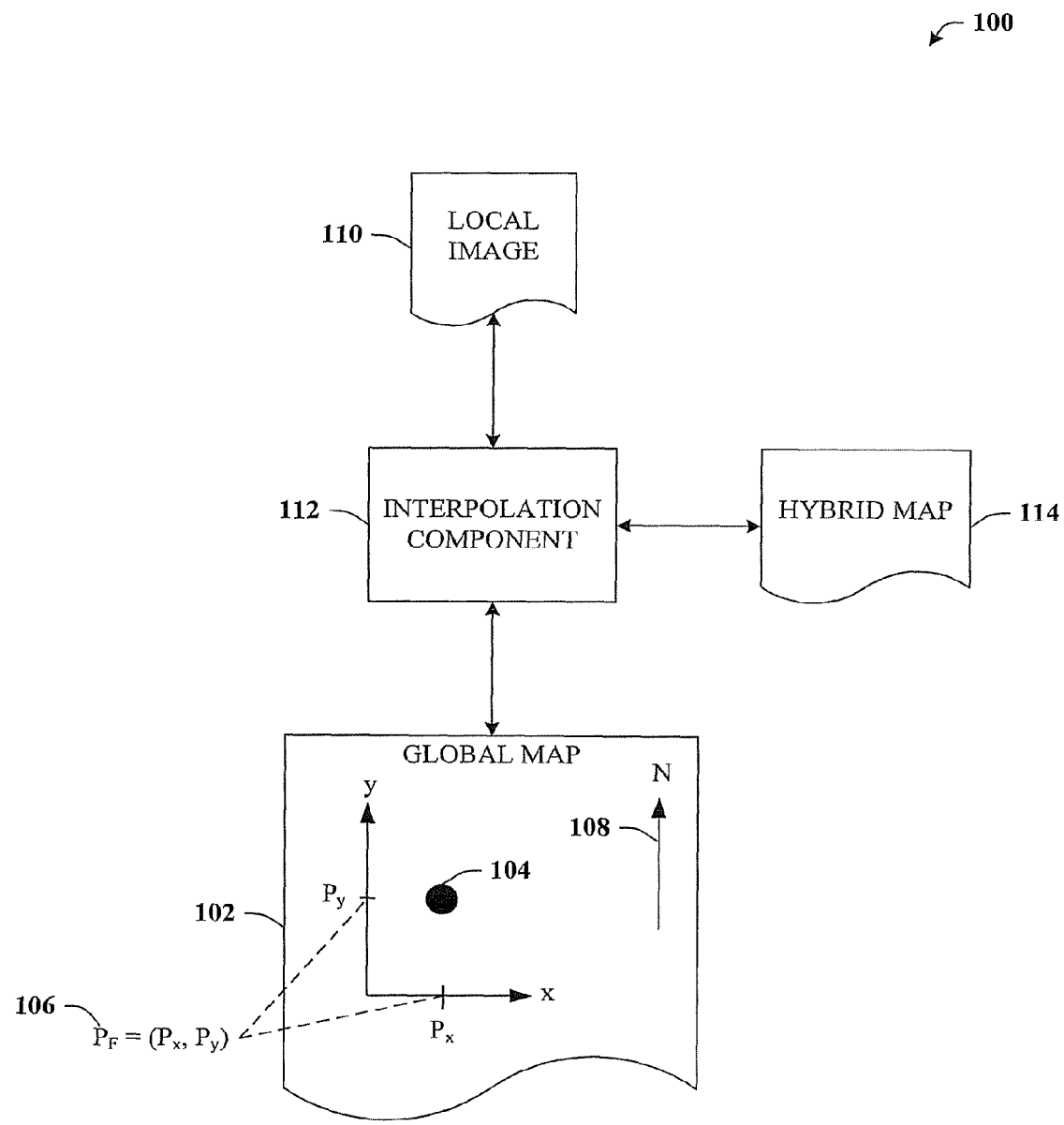
FIG. 1 is a block diagram of a system that provides local information at or near a feature on a global map.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the terms "street-side" and/or "local" when referring to images, views, and/or perspectives can denote a first-person view from the perspective of ground level, street level, or another relevant position along a trafficked path such as road or corridor, etc. The first-person view can be, e.g., an image that represents a view from a feature position, or a view of the feature. Local image and street-side image can be used interchangeably herein and can be a single image, a panorama (e.g., employing technologies such as push-broom, image stitching, or any other technology for constructing a panorama), and/or a 3-D model of the feature. In the case where the local image is a 3-D model, the model can be projected from a top-down view such that all the sides of the model are visible simultaneously.

Similarly, the term "global map", as used herein can denote a top-down, orthographic projection of a surface and can depict various features of the surface. The term "road map" can refer to a specialized global map in which the primary features are roads, paths, corridors, and/or any potential route of travel between locations. As used herein, the term "perspective axis" can refer to an axis representing the perspective of the image. For example, if the image is a photograph of a feature or a photograph from a feature position, then the perspective axis can be the line of sight between the camera position when the photograph was imaged, and the scene depicted by the image in corporeal space. Hence, if the camera photographs a scene that is due north of the camera position, the perspective axis will run due north on an orthographic projection map (e.g., a global map).

Referring initially to FIG. 1, a computer-implemented system 100 that can provide local information at or near a feature on a global map is illustrated. Generally, the system 100 can include a global map 102 with a feature 104 at a feature position 106, denoted $P_F$. Typically, the global map 102 will be an orthographic projection of a spherical surface such as the Earth or another celestial body. However, it is to be appreciated that the global map 102 can also be the top-down, orthographic projection of an object such as a building (e.g., a top-down representation of the layout of the structure showing internal features such as walls, corridors, etc.).

The global map 102 can be oriented with a northern direction along the surface pointing up on the global map 102, as depicted by compose rose 108. It is to be appreciated that the global map 102 can be stored in, e.g., computer-implemented data structures and, as such, the feature position 106 can be represented in standard Cartesian coordinates, e.g., $P_F=(P_x, P_y)$, wherein each point, P, can be, e.g., a pixel for the global map 102. However, this need not be the case and other ways of representing the global map 102 as well as the components 104-108 are contemplated and are considered to be within the spirit and scope of the disclosure and appended claims. It is also to be understood that for the sake of brevity and understanding only a single feature 104 is depicted on the global map 102, however; the global map 102 can include a plurality of features 104, each at a feature position 106.

The global map 102 can be a general map and can also be a specialized orthographic projection of a surface such as a physical map or a road map. Accordingly, the feature 104 can be substantially any element useful for providing location information to a user of the global map 102. For example, the feature 104 can be a road, path, waterway, etc. (or portion thereof) as is common in the case where the global map 102 is a road map. Additionally or alternatively, the feature 104 can be a land formation, a building, a statue, a garden, or substantially any other potential point of interest. Moreover, this concept can be generalized to other types of maps as well. For instance, interior maps of shopping malls, where the images can be the facades of the shops; or an interior map of an apartment, where the images of all the walls can be projected on top of the apartment blue print.

Figure 2A:
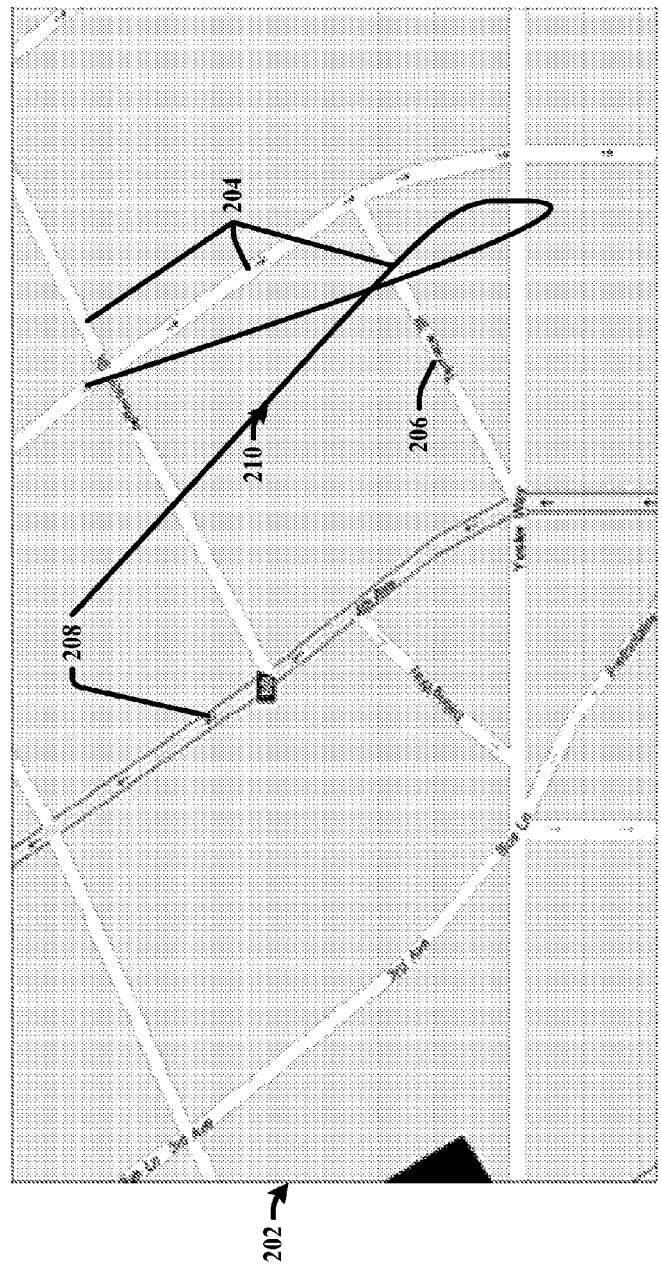
FIG. 2A is an exemplary road map, which is a specialized orthographic projection map wherein the primary features are roads.

For example, FIG. 2A illustrates an exemplary global map 202 in which the global map 202 is a road map. Accordingly, the basic features 204 of the global map 202 are roads. As an orthographic projection, the global map 202 is very effective at communicating certain global information such as distance, direction, orientation, size etc. For instance, a user can readily ascertain which way is north (e.g., up on the global map 202), when and where a road curves, whether particular roads are parallel or perpendicular to each other, whether one road is longer or shorter than another, etc. In addition, the roads can be identified with a road name 206 as well as an indication (e.g., with directional arrows 208) that a road is a one-way road.

While the global map 202 can present a great deal of information in terms of the positive features 104 (e.g., roads), a user can also be apprised of much information by what is not positively displayed. For example, the negative space 210 represents a city block, bounded on all sides by roads. Accordingly, while not expressly indicated on the global map 202, a user can infer that buildings probably line these streets and, moreover, that no suitable path exists in the negative space 210 since no road features 204 are depicted. However, the negative space 210 is not capable of imparting much more information to a user.

Moreover, while global map 202 has many other shortcomings For example, when a user desires to locate his position on the map 202, the only viable way of doing such is by road intersections (e.g., roads or features 204 in relation to each other). The user typically has no information regarding subfeatures on a road, unless some landmark on the road is marked on the map 202. As such, global map 202 could be improved to display even more information, which is discussed infra.

Referring back to FIG. 1, the global map 102 illustrates feature 104 at feature position 106. As is inherent in maps, this feature 104 usually represents an object in the "real" world (e.g., corporeal). Similarly, the feature position 206 translates to a particular corporeal location. Accordingly, in order to simplify explanation and provide clarity, as used herein and in the appended claims, feature 104 and feature position 106 can denote the feature 104 and feature position 106, respectively, on the global map 102 as well as the corporeal scene depicted at the corporeal location, respectively. In accordance therewith, the system 100 can also include a local image 110. The local image 110 can relate to the feature 104 in a very direct way. For example, if the feature 104 is, e.g., a statue, then the local image 110 can be a photographic representation of the statue.

However, in accordance with another aspect, the local image 110 need not depict the feature 104. Rather, in some cases, the local image 110 can depict a scene that is visible from feature position 106, but is not otherwise related to the feature 104. For example, if the feature 104 represented on the global map 102 is a road, the local image 110 can depict a house or building that is visible from that feature position 106 on the road (e.g., feature 104), without including, or only tangentially including the actual road.

Figure 6B:
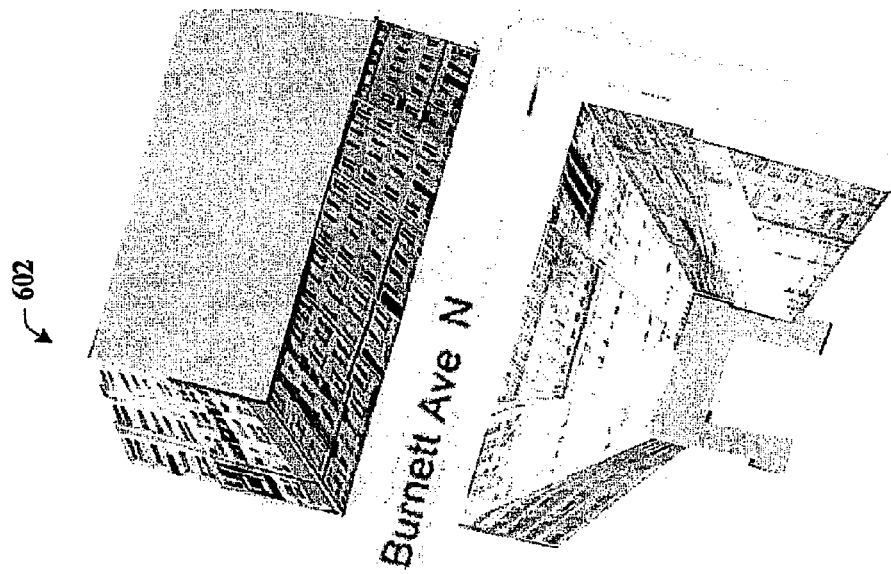
FIG. 6B illustrates an exemplary hybrid map with the 3-D models enhanced.
Figure 6A:
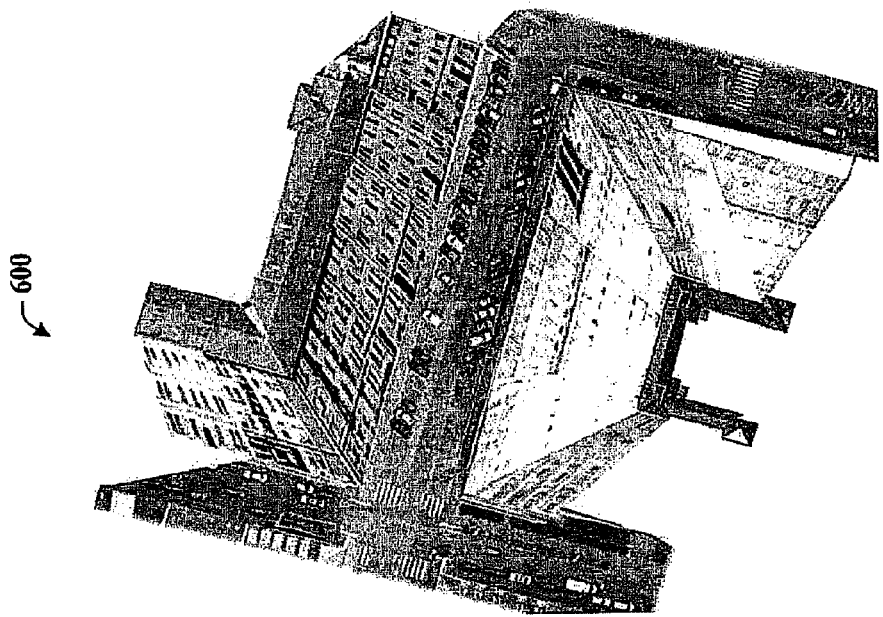
FIG. 6A illustrates an exemplary hybrid map based upon 3-D models of an object and/or scene.
Figure 7:
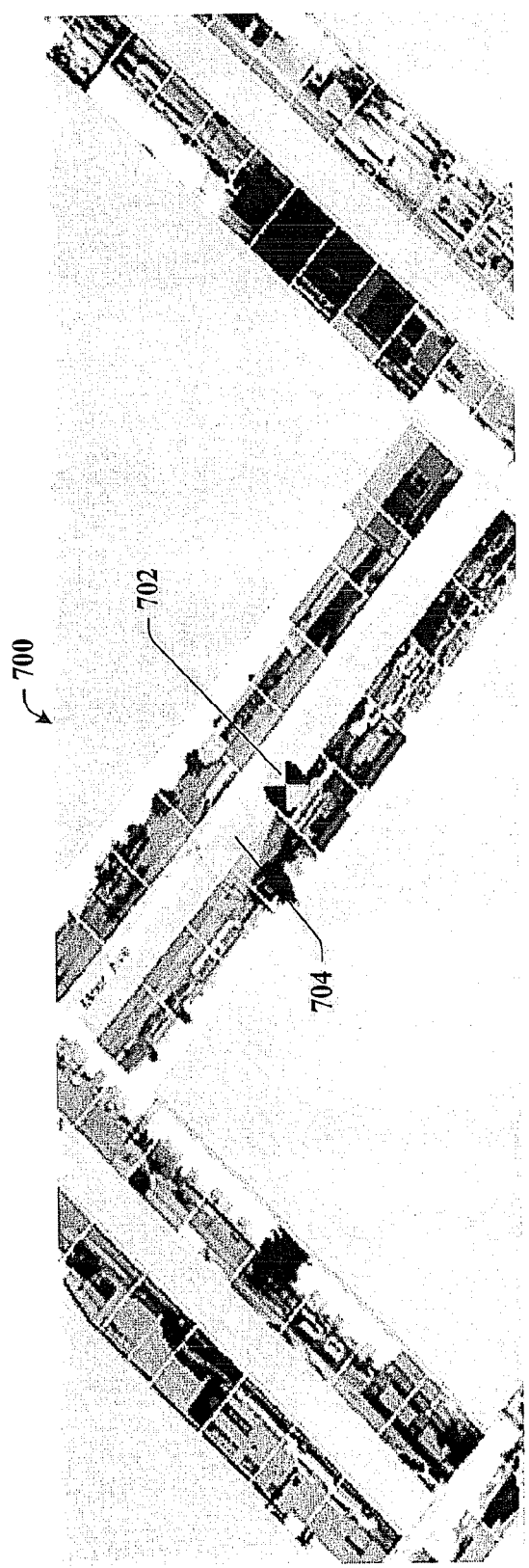
FIG. 7 depicts an exemplary hybrid map in accordance with the claimed subject matter.

Accordingly, while the local image 110 can depict the feature 104, local image 110 can be more conveniently described as an image of a scene from a vantage point at or near the feature position 106. That is, an image of a scene (e.g., local image 110) at or near feature position 106 does not necessarily, but can include the feature 104. It is to be appreciated while only one local image 110 is shown, the system 100 can include a plurality of local images 110, each of which can depict a scene at various feature position(s) 106. It is to be further appreciated that the local image 110 can be a single image, a panorama (e.g., employing technologies such as push-broom, image stitching, or any other technology for constructing a panorama), and/or a 3-D model (discussed infra regarding FIGS. 6A-6B) of the feature 104. The local image 110 is typically a first-person, ground-level perspective of the scene, but such is not always the case, e.g., when the local image is a 3-D model or when the local image depicts a scene along a route that is not at ground level such as the top floor of a building.

Figure 2B:
FIG. 2B depicts an exemplary local image comprising a panorama of a street-side scene.

An exemplary local image 212 is depicted in FIG. 2B. The local image 212 is a panorama of a street-side scene. Generally, panoramas are continuous images of a street/road side, and can be generated in a number of ways. For example, a panorama can be a sequence of images along a path stitched together. The stitching can employ, e.g., depth measurements of the scene (such as stereo matching or from Light Detecting And Ranging (LIDAR) techniques), edge detection techniques, distances from perspective axes, and/or the like. The panorama can also be generated by directly capturing orthographic imagery using, e.g., a push-broom camera that captures one column of the final image at a time. Such a panorama (e.g., local image 212) can be generated by a camera that is mounted on a vehicle traveling along a street or as a stitching of photography taken on foot.

Regardless of the technology employed to create the panorama, it is to be appreciated that each segment along a path, or on a road on the map (e.g., along a road/feature 204 of global map 202 from FIG. 2A) can define two such street-side panoramas, one for each side of the street/road. By employing local image 212, it is quite easy to identify a specific location such as a store, a house, etc., since the representation is very close to the corporeal view of the object from the perspective of a ground-level viewer. However, from such a panorama (e.g., local image 212), it is not obvious where is the actual location of the house is in the world or in relation to a global map (e.g., global map 102 from FIG. 1).

For example, it is not clear if the depicted street-side scene follows a road that runs from north to south or from east to west, if the road curves, or how far the road continues. It is also hard to visualize how one street-side scene will interact with another, e.g., when switching from one street-side scene or image to another such as when the traveler changes locations. Furthermore, many tasks, such as driving directions or description of a neighborhood require the description of more than one side of a street at a time. Thus, there are also a number of shortcomings with street-side images because most global information such as that contained in orthographic projection maps are not present. As such, navigation by these types of images can be very difficult and also require many images that must be independently retrieved and, as well, cannot be easily printed and carried along with a traveler.

Referring again back to FIG. 1, the system 100 can also include an interpolation component 112. The interpolation component 112 can create a hybrid map 114 by, e.g., interpolating the data found in the global map 102 with data resident in the local image 110. Accordingly, the interpolation component 112 can embed the local image 110 in the global map 102 to produce the hybrid map 114. Generally, the hybrid map 114 retains the structure of the global map 102 that is effective at illustrating global information such as distances, orientation, curvature of roads, and/or other relationships between the features 104. In addition, hybrid map 114 can also employ effective visualization imagery found in local image 110. It is also to be appreciated that the local image 110 displayed on the hybrid map 114 can also be embedded with hyperlinks (not shown). As such, a user viewing the hybrid map 114 in a setting that allows hyperlinks, can click on the local image 110 to receive more information about this scene and/or feature.

Figure 3:
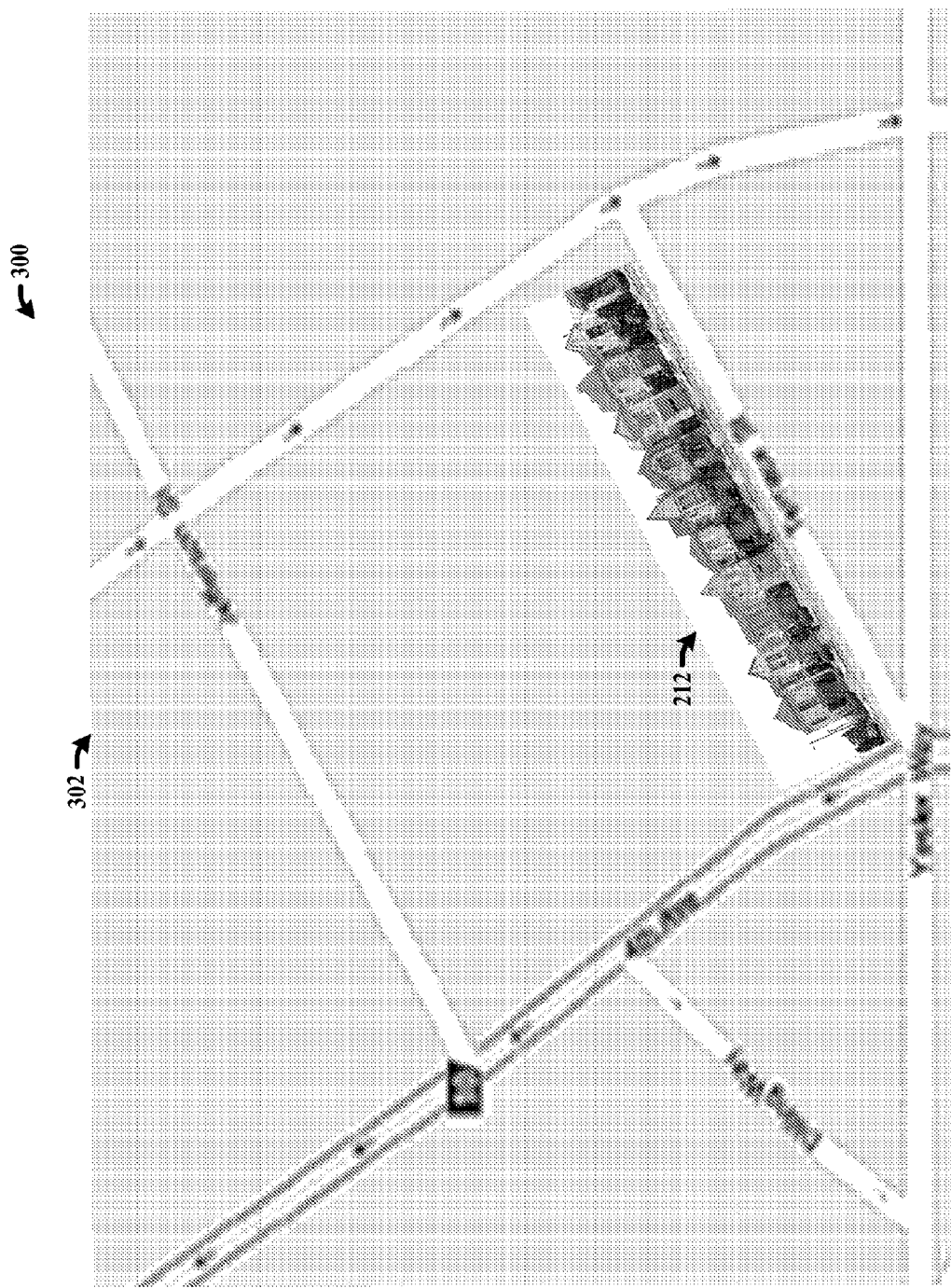
FIG. 3 illustrates an exemplary hybrid map with a local image interpolated over an orthographic projection map.

In accordance with one aspect, the interpolation component 112 can make better use of the negative space 210 (from FIG. 2A) by inserting the local image(s) 110 along the sides of the roads. For example, if the panoramic local image 212 (from FIG. 2B) depicts a scene along one side of road 206 (from FIG. 2A), then the local image 212 can be interpolated at or near a feature position of road/feature 206. Such an interpolation can be found with reference to FIG. 3, which depicts a hybrid map 300 with a global map 302 (shown here as a portion of the global map 202 from FIG. 2) interpolated with the street-side panorama local image 212. The orientation of the local image 212 can be with reference to the particular road from which the image 212 was captured. The orientation can also be achieved based upon compass directions as described below.

Figure 4:
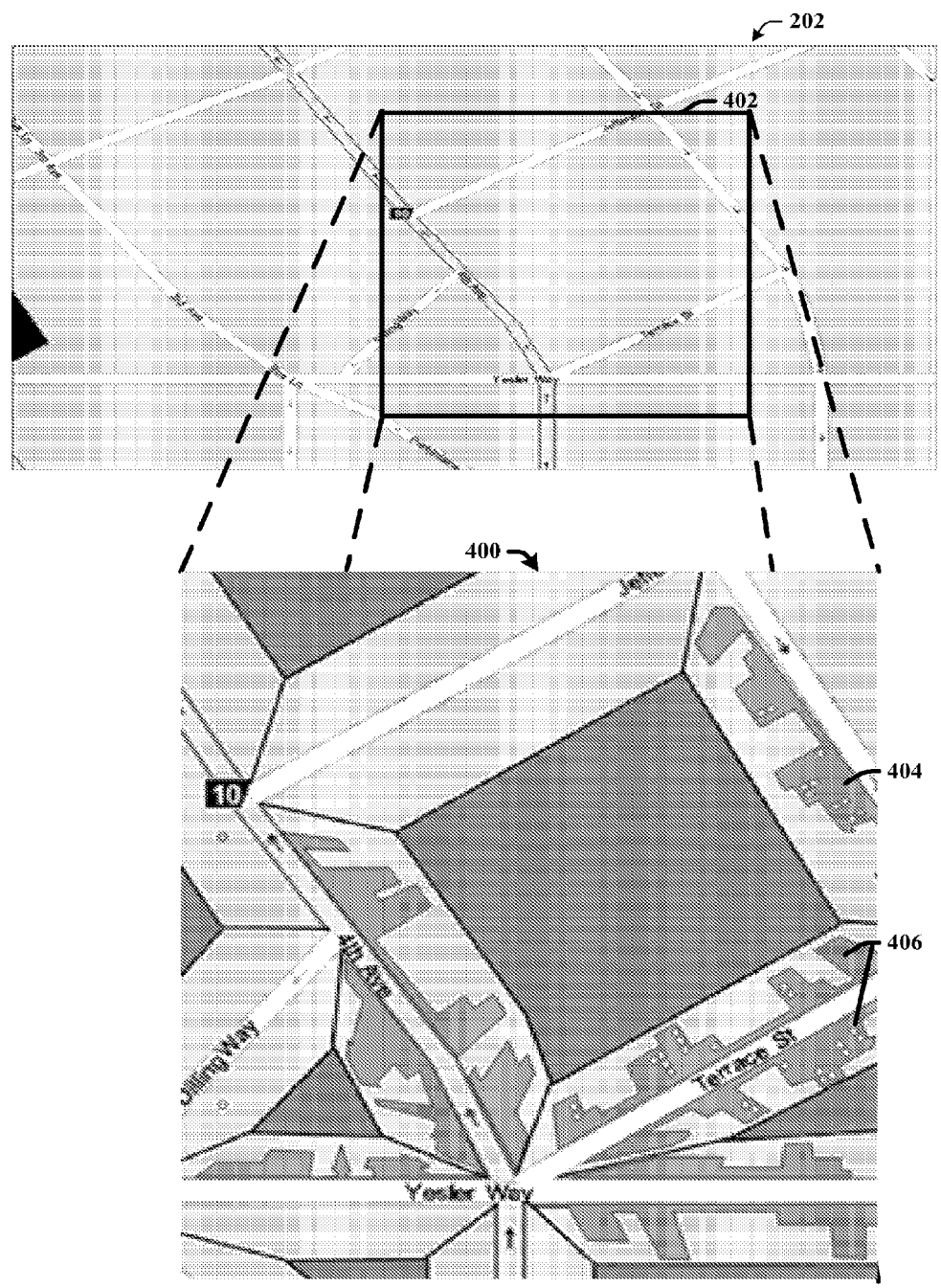
FIG. 4 illustrates another exemplary hybrid map of a portion of a global map.
Figure 5B:
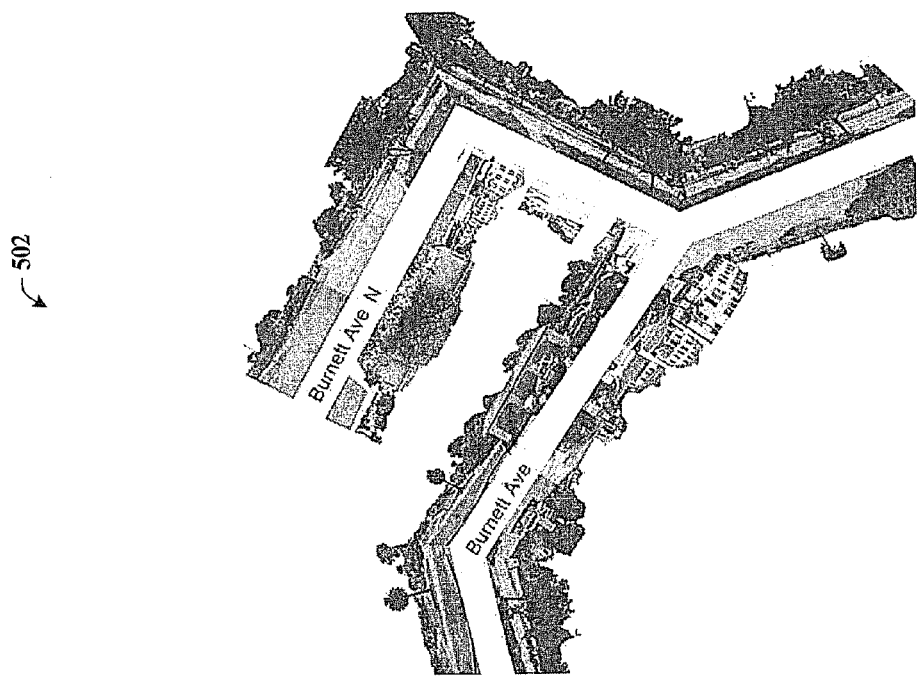
FIG. 5B depicts an exemplary hybrid map in accordance with the claimed subject matter with the local images enhanced.
Figure 5A:
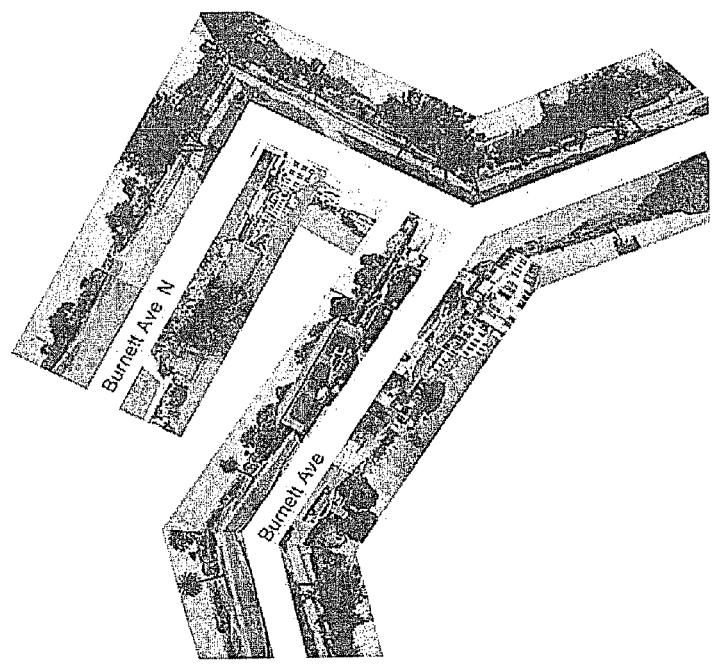
FIG. 5A depicts an exemplary hybrid map in accordance with the claimed subject matter.

Turning now to FIG. 4, a hybrid map 400 in accordance with another aspect of the claimed subject matter is illustrated. The hybrid map 400 represents a portion of the underlying global map 202, bounded by a section 402. As shown, the hybrid map 400 maintains the structure of the underlying global map 202 and therefore maintains important global information relevant to a user/traveler. In addition, the hybrid map 400 also shows street-side panoramas 404. It is relevant to note that these street-side panoramas 404 are shown on both sides of a given road (e.g., feature of the global map) as illustrated by elements 406. In this case, the rendering of the street-side panoramas 404-406 is not realistic, since there is no single point-of-view showing all street sides.

However, the view of the street side, allows for fast recognition of objects on the scene, from ground level. On the other hand, since the global map 202 structure is maintained, the user can localize herself, understand the street direction, the direction and distances to her target, the relations to other streets, both those that intersect the street where she is walking/driving and those parallel to it. Hence, at any point, the user can localize herself and be reassured of her current location by recognizing the objects around her represented by the street-side panoramas 404-406 on the street, where she is located. Moreover, all this information is available in a single representation (e.g., the hybrid map 400), which is readily printable; and while access to the Internet or cache is available, the street-side panoramas 404-406 can be clicked on (e.g., embedded with hyperlinks) to yield more in-depth information.

With reference now to FIGS. 5A through FIG. 7, various exemplary hybrid maps 500, 502, 600, 602, and 700, respectively, in accordance with numerous other aspects are depicted. Hybrid map 500 illustrates a street map interpolated with images of house and trees along the streets, as scene from the represented street. Hybrid map 502 shows the same street map interpolated with nearly identical images of the street scene, but in which the sky has been removed and separation of the houses has been implemented to provide clarity and/or additional reference to the user.

Hybrid map 600 is a map in which the street-side images (e.g., local images) are 3-D models. Hybrid map 602 similarly employs 3-D models as the street-side images interpolated onto the global map, but the graphics of the road and cars, etc. are replaced with a street representation and street name. In addition, the roof structures of the houses have been removed and neighboring houses are separated with a partition.

Hybrid map 700 once again maintains the structure of a road map but does not use panoramas as the local images. Rather, Hybrid map 700 employs a plurality of individual images that are arranged at the appropriate locations along the road. Hybrid map 700 also provides an indication of a user's current location with an icon 702 as well as the user's current direction of travel, denoted by the light cone 704.

An exhaustive list of all the potential embodiments is, of course not possible. Other embodiments exist and are considered to be with the scope of this disclosure and appended claims. However, the given examples suffice to introduce a variety of concepts relevant to aid in an understanding of the claimed subject matter, and other concepts can be readily identified by one of ordinary skill in the art. For example, with reference to FIGS. 5A-7, it can be understood that the actual style of display for a hybrid map is not fixed, but rather can be varied for suitability of the application. For instance, different display styles can be employed based upon, e.g., the types of local images that are available (e.g., single images versus panorama images, etc.), the type of global map employed (e.g., a road map versus a physical map, etc.), the density of features represented on the global map (e.g., a rural area with lots of negative space between road versus an urban area with relatively little negative space, etc.), as well as other factors.

In accordance therewith, the display style might be varied such that block sides can be projected on the sides of the street as parallel rectangles (e.g., hybrid maps 500, 502, and 700) or as trapezoidal shapes (e.g., hybrid maps 600 and 602). In order to enhance readability or, e.g., satisfy a user preference, the hybrid maps can also be displayed such that the sky, rooftops, or distant objects are removed from the local images (e.g., hybrid maps 502 and 602). In addition, distinct objects in the street-side scene can be separated, e.g., by sharp edges or highlights to accentuate the distinct objects. As well, some objects can be determined to be more important than other objects. As such the more important objects can be offset in various ways to illustrate the relative importance. For example, the important objects in a scene can be depicted as larger than the less important objects in the scene. Additionally or alternatively, the object can be depicted with a different amount of contrast to highlight or de-emphasize the object based upon its importance.

Emphasizing and/or de-emphasizing (or omitting entirely) objects in a scene can be of particular importance to a traveler. For example, hybrid maps 500700 generally depict a representation of an urban area. As described, these hybrid maps 500-700 can be very useful for a traveler exploring the areas depicted by the map(s). In one case the traveler might be searching for a particular house. Typical orthographic maps might not show the requisite detail to represent houses at all, or if so only represent the house as, e.g., a square which is indistinguishable from other similar squares that denote other houses. The hybrid maps can, however, also provide a visual of the particular house in question indicating to the traveler the proper destination sought. In another case, a city tourist may remember that he parked on a street next to a certain identifiable building (e.g., because it had a distinct shape or color) but otherwise does not know exactly where he parked. In either case, the hybrid maps can aid the user by appropriately integrating useful information from both global maps and local images.

However, in other situations, especially when a traveler is concerned with planning routes from point A to point B, objects depicted in the street-side scene (e.g., local image) need not be given equal emphasis. Generally, a good map is one that provides the viewer with useful information, but not so much that extraneous information detracts from the experience. Accordingly, objects at important locations (e.g., at intersections along a planned route) can be emphasized with the use of size and/or contrast, while objects of lesser importance along the route can be de-emphasized with size, contrast, and/or by omitting entirely. For example, a traveler might be very interested to see the local image of a gas station where his planned route indicates he is to turn, but might not be interested in a local image of a statue in the middle of a very long portion of the route with no nearby changes in course. In that case, the gas station can be emphasized and the statue can be de-emphasized or removed from the map altogether.

In accordance with another aspect of the claimed subject matter, it is to be understood and appreciated that the actual projection of the images may be an orthographic projection along the x-axis or it may be an orthographic projection in the y-axis direction. In either case, the projection can retain certain perspective. Moreover, while the local images can be single images, panorama images, 3-D models, etc., it is not necessarily important how these local images are obtained or how the panoramas are created.

Figure 8:
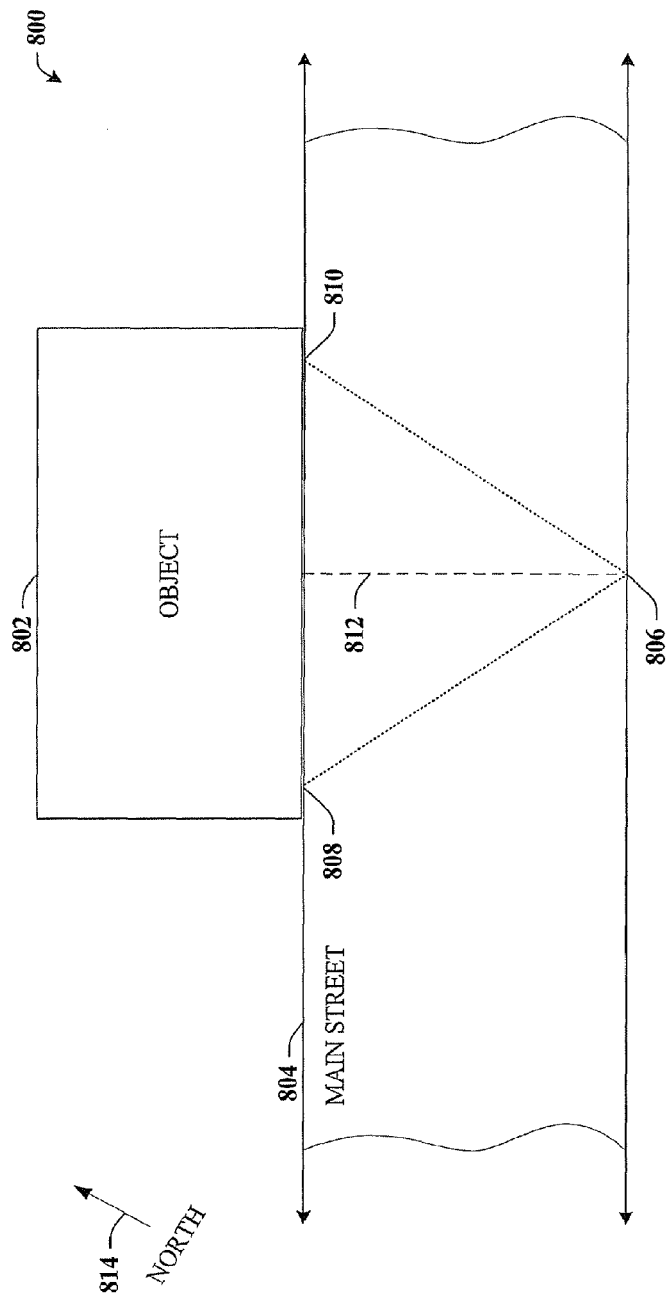
FIG. 8 is a block diagram of an exemplary corporeal scene in which a local image can be captured.

Referring briefly to FIG. 8, an exemplary corporeal environment 800 is depicted. The environment 800 can include an object 802 that is situated along Main Street 804. On the opposite side of Main Street 804 is a camera location 806 in which a camera (not shown) photographs a scene bounded by points 808 and 810. Here, the scene 808-810 is a portion of the object 802; however, the scene could entirely encompass the object 802 or encompass all or portions of several proximal objects 802. Accordingly, the scene 808-810 can represent a local image (e.g., local image 110 from FIG. 1). A perspective axis 812 is also depicted, denoting the line of sight from the camera location 806 to the object 802.

Since the corporeal environment 800 inherently includes compass information, illustrated here by the compass rose 814, this information can be included in the local image that represents the scene 808-810. For example, metadata can be embedded in the image that describes the direction the camera was facing when the image of scene 808-810 was captured. This can be accomplished by, e.g., a camera equipped with a compass device that automatically inputs the metadata, or by any other means such as a component independent of the camera capable of embedding compass/directional metadata. This compass metadata can be useful in orienting local images, but is not necessary as can be seen with reference to FIG. 9.

Figure 9:
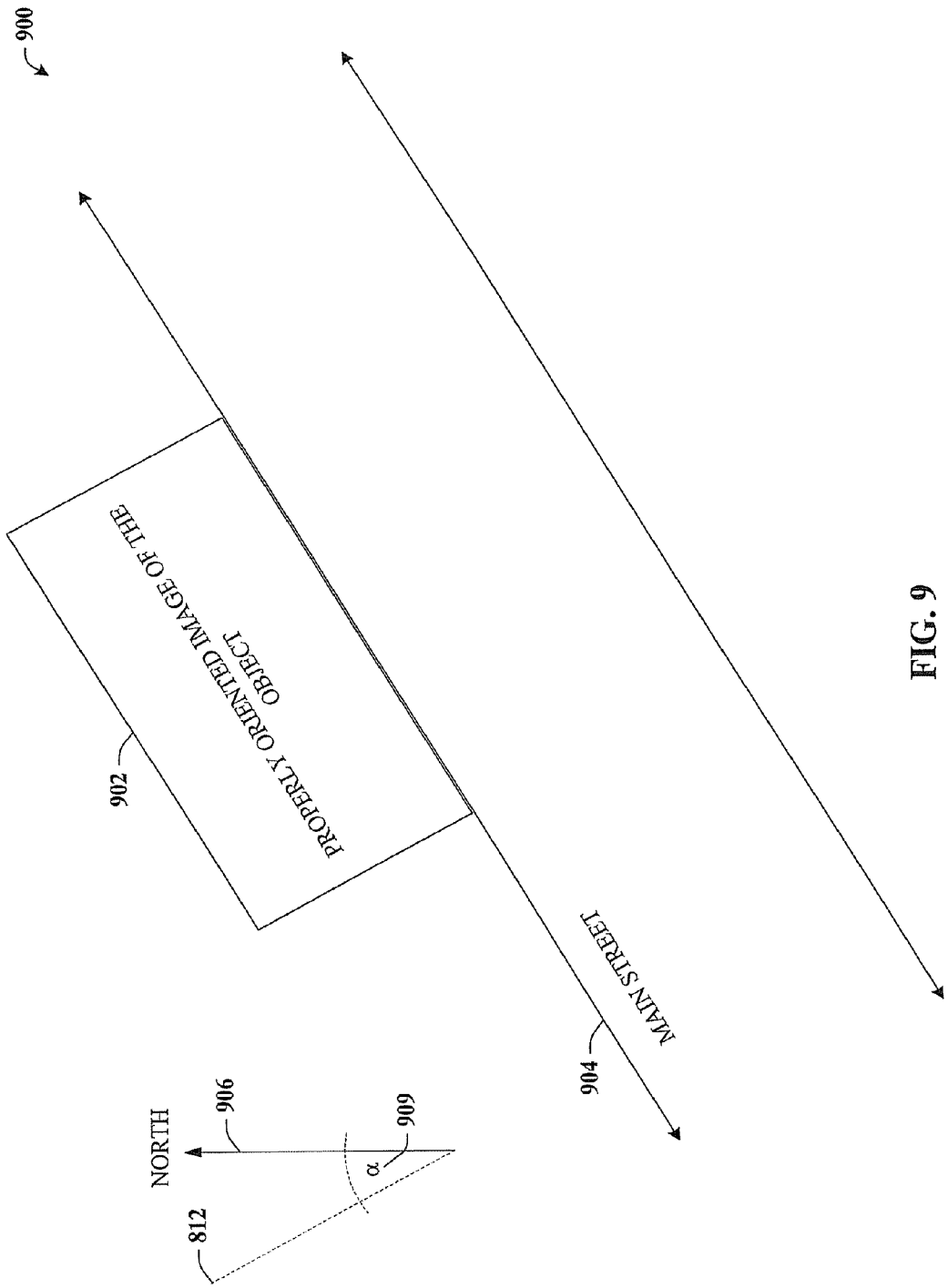
FIG. 9 is an exemplary hybrid map with the local image properly oriented with respect to an orthographic projection.

Turning now to FIG. 9, an exemplary hybrid map 900 is illustrated. As described supra, the hybrid map 900 can insert properly oriented local images 902 of an object or scene, while maintaining certain global information such as features from a global map. In the case where the hybrid map 900 employs a road map, the primary features on the hybrid map will be roads, such as Main Street 904. Accordingly, the image 902 can be readily oriented based upon the road 904. That is, the angle in which the camera was facing when the image 902 was captured need not be known when, e.g., it is known that the scene depicted in the image 902 is a street-side image along Main Street 904. Thus, the image 902 can be properly oriented and displayed in accordance with any of the display styles described herein.

However, as with global maps, hybrid maps (e.g., hybrid map 900) typically, are oriented such that north faces up, as indicated by the compass rose 906. Thus, the image 902 can also be oriented with respect to a compass direction, if such information is available (e.g., from image metadata). In broken lines, overlaying the compass rose 906, also shown is the perspective axis 812 (from FIG. 8) and an angle, a 908 that shows the angle between the perspective axis 812 and north on the compass 906. As such, image 902 could also be oriented by rotating the image a 908 degrees. This could be especially useful when, e.g., there are not any nearby features (e.g., roads) or when the underlying global map is not a road map.

Figure 10:
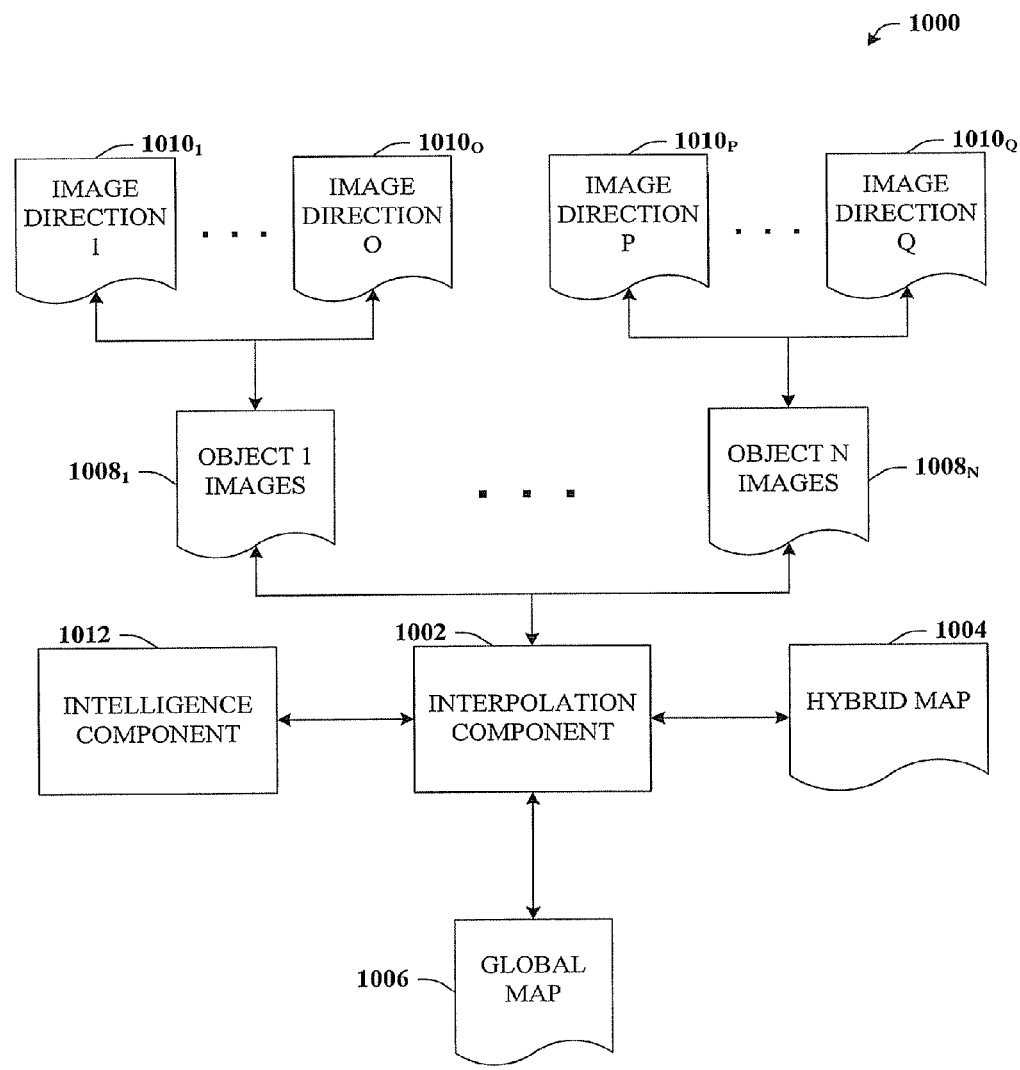
FIG. 10 illustrates an exemplary a computer-implemented system that can provide local information at or near a feature on a global map.

With reference now to FIG. 10, a computer-implemented system 1000 that can provide local information at or near a feature on a global map is illustrated. Generally, the system 1000 can include an interpolation component 1002 that can generate a hybrid map 1004.

The hybrid map 1004 can maintain relevant global information found in global map 1006, which can be substantially similar to global map 102 described with reference to FIG. 1. Hybrid map 1004 can also include important visual recognition information found in images $1008_1$-$1008_N$, referred to collectively or individually as images 1008. It is to be appreciated that although the images 1008 can be referred to collectively, hereafter each respective image 1008 can have unique properties that distinguish each of images 1008.

It is to be further appreciated that an image of an object or scene (e.g., image 1008) can be captured from different directions. For example, the image of a building on a corner created by the intersection of two roads can appear different depending upon the perspective/direction an observer faces. That is, the building may look different from the side visible to a road traversing the north-south direction than it appears from a second road heading in the east-west directions. Accordingly, it is significant to distinguish these object images 1008, even though each image 1008 depicts the same object (albeit from different directions $1010_1$-$1010_O$, also referred to herein either collectively or individually as direction 1010).

Accordingly, all the images 1008 can be aligned on the hybrid map 1004 such that each street (e.g., feature taken from the global map 1006) has a representation of what a traveler will see when, e.g., walking or driving down that street. In some cases, this can give a non-perspective image, e.g., if the traveler sees a house and this house is bounded on all sides by streets, the traveler will see images 1008 of the same house from four different directions 1010 displayed on the hybrid map 1004, each one along the corresponding street.

In accordance therewith, the interpolation component 1002 can insert the images 1008 at a proper location on the global map 1006 to create the hybrid map 1004. In addition, the interpolation component often must also properly orient the images 1008 within the hybrid map 1004 in connection with the global map 1006. This can be accomplished in several different ways. One way is to align the images 1008 with features (not shown) depicted on the global map 1006, e.g., roads. Another way to align the images 1008 is to employ compass directional data relating to the perspective axis of an image, e.g., when there are no nearby globally aligned features and directional metadata is available.

The system 1000 can also include an intelligence component 1012 that can be integrated in the interpolation component 1012 or, as depicted here be operatively coupled to the interpolation component 1012. The intelligence component can, inter alia, aid the interpolation component 1002 in determining how to orient the images 1008 on the hybrid map 1004, e.g., which method of orientation to employ or when one method is preferable to another. As described herein, the interpolation component 1002 can also render the hybrid map 1004 with different display styles as well as deciding which objects are more important than other objects when object emphasis and de-emphasis is desired. The intelligence component 1012 can be employed to aid in these tasks as well.

For example, the intelligence component 1012 can examine the entirety or a subset of the data available (e.g., data relating to the global map 1006, the images 1008, the density of features in the mapped surface, the type of map or maps, the types of the image or images . . . ) and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In accordance with the foregoing and still referring to FIG. 10, the hybrid map 1004 can be a very convenient solution with a much richer set of information provided to a user. The hybrid map 1004 street-side imagery within the context of a global map (e.g., global map 1006). The general structure of the map represents the global information (distances, orientation, curvature of the streets, relation between neighboring streets, etc.), while the imagery, displayed on both sides of every street or road, shows the local information. All this information can be provided in a single image that is printable, allowing the user to print the hybrid map 1004 and carry the map along without the need of scores or even hundreds of local image printouts and/or persistent access to the Internet during travel. The user can scan the hybrid map 1004, looking for a specific target, or get a global understanding of the area (e.g., "Here is a nice street, that has a lot of trees", or "here is a gas station or an interesting spot on the way").

Figure 11:
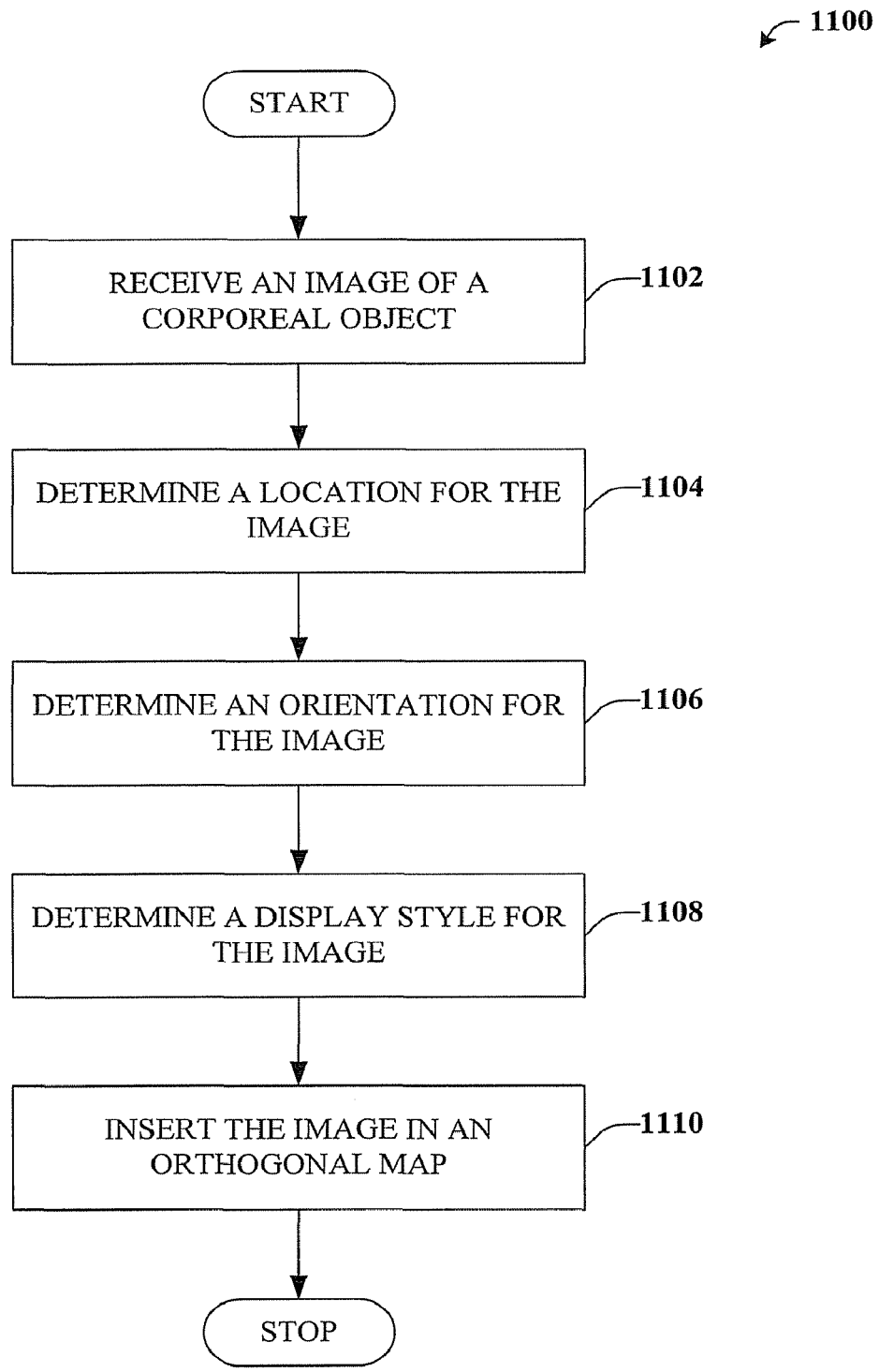
FIG. 11 is an exemplary flow chart of procedures for generating a hybrid map that can provide local detail information and global map context.

FIG. 11 illustrates a process flow diagram of a computer-implemented method 1100 for generating a hybrid map that provides local feature detail and global map context. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 1102, an image or set of images of a corporeal object can be received that relates to a location on an orthographic projection map. The images can be a first-person, ground-level image such as a street-side image and can be in the form of a single object image, a panorama, a 3-D model, and/or the like. The object can be imaged in whole or in part or it could be only one of a plurality of objects in the image or images. Moreover, the set of images could depict the same object but from different directions of view.

At 1104, a location for the image can be determined, e.g., based upon the position on a global map of the object depicted. At 1106, an orientation for the image can be determined. The orientation can be determined relative to features on a global map (e.g., roads) or based upon an objective compass direction. For example, metadata can be embedded in an image describing the direction of the perspective axis when the image was recorded. At 1108, a display style can be determined based upon a variety of factors. For instance, different display styles can be chosen based upon, e.g., the types of local images that are available, the type of global map employed, the density of features represented on the global map as well as other factors. Hence, the display style may be selected based upon whether the local images are single images, panoramas, 3-D images, etc. Similarly, the display style may vary based upon whether the orthographic projection map is a road map or another type of map. As well, the display style can be selected depending upon whether the orthographic projection map depicts a rural area or an urban area. At 1110, the image can be inserted in a hybrid map with the determined display type at the determined location and at the determined orientation.

Turning now to FIG. 12A, an ancient map from circa 6th century A.D. is shown. The map is a part of a mosaic floor discovered in the ancient city of Midba, depicting a map of ancient Jerusalem. While the main street of the city shows the houses on both sides of the street, all houses are drawn from a single viewpoint, as the artist imagined them. That is, the houses are not shown from multiple perspectives, but rather only from a single perspective, which is roughly from the very center of the map. Hence, each house is only depicted once from the central perspective, so there is no consistent rendering of the views seen from streets other than the main, central street. Thus, perspectives, and therefore scenes/views of the houses as would be observed from any street other than the main street are not shown, since the houses along them are already drawn with respect to the central perspective. Moreover, while the map of Jerusalem also depicts an orthographic projection (located at the far left of the map), the local images are not provided in that context.

With reference now to FIG. 12B a three-dimensional rendering of a contemporary city street is depicted. In this case, more than one face of some of the buildings can be seen simultaneously, however, the view is again based upon a dominant perspective that is located at the center of the map. Hence, a user of this map can see various details of local features/objects, but only from the dominant perspective. Moreover, the user is not provided the context of a global orthographic projection map. Accordingly, none of these maps (e.g., maps depicted in FIGS. 12A and 12B) represent a geographical area, such as represented in an orthographic projection map from multiple possible ground view points, while, in addition, maintaining the global positioning information.

Figure 13:
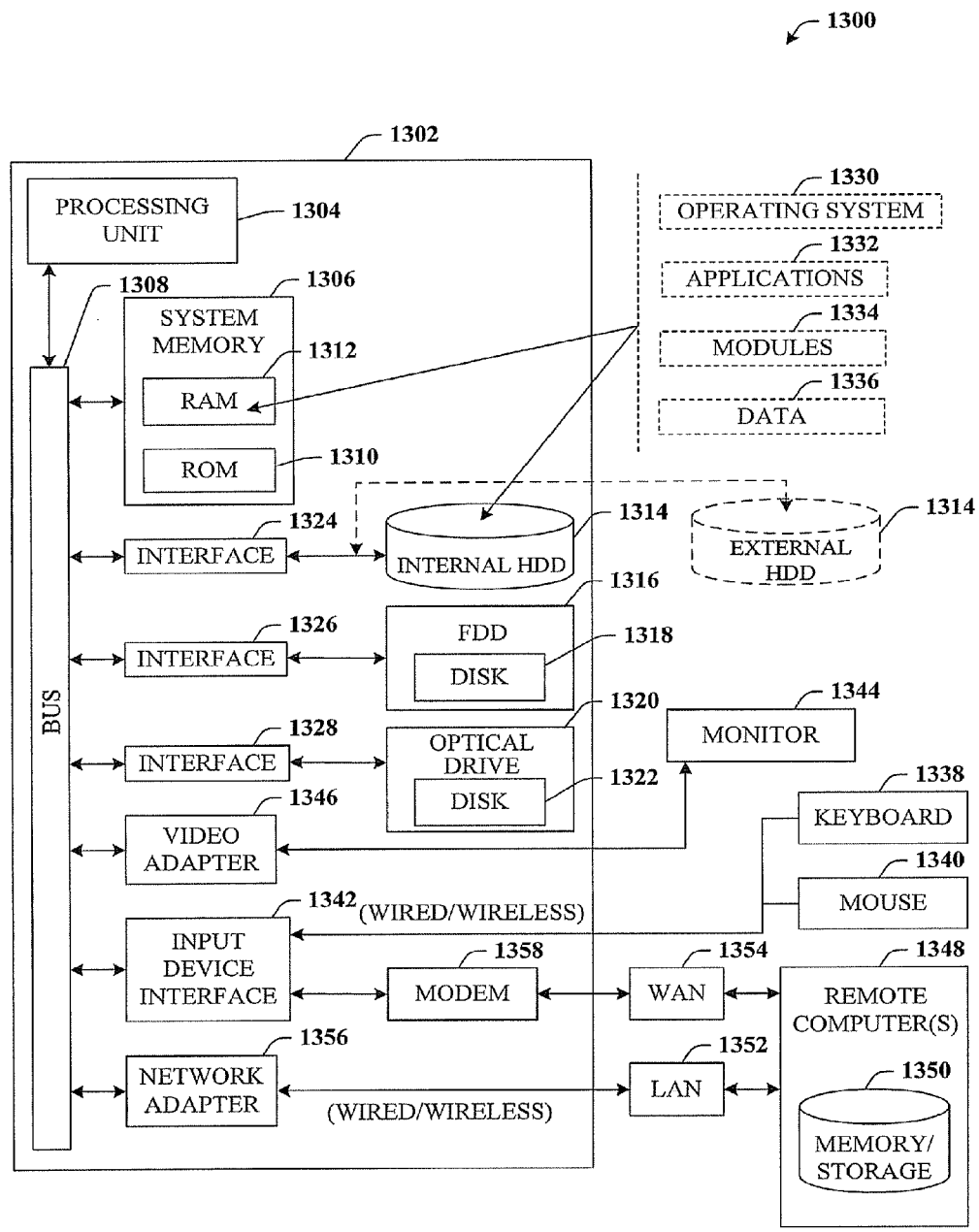
FIG. 13 illustrates a block diagram of a computer operable to execute the disclosed architecture.

Referring now to FIG. 13, there is illustrated a block diagram of an exemplary computer system operable to execute the disclosed architecture. In order to provide additional context for various aspects of the claimed subject matter, FIG. 13 and the following discussion are intended to provide a brief, general description of a suitable computing environment 1300 in which the various aspects of the claimed subject matter can be implemented. For example, various components of the systems and/or aspects thereof described supra can be implemented by way of the system 1300. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types.

Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the claimed subject matter includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the claimed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 14:
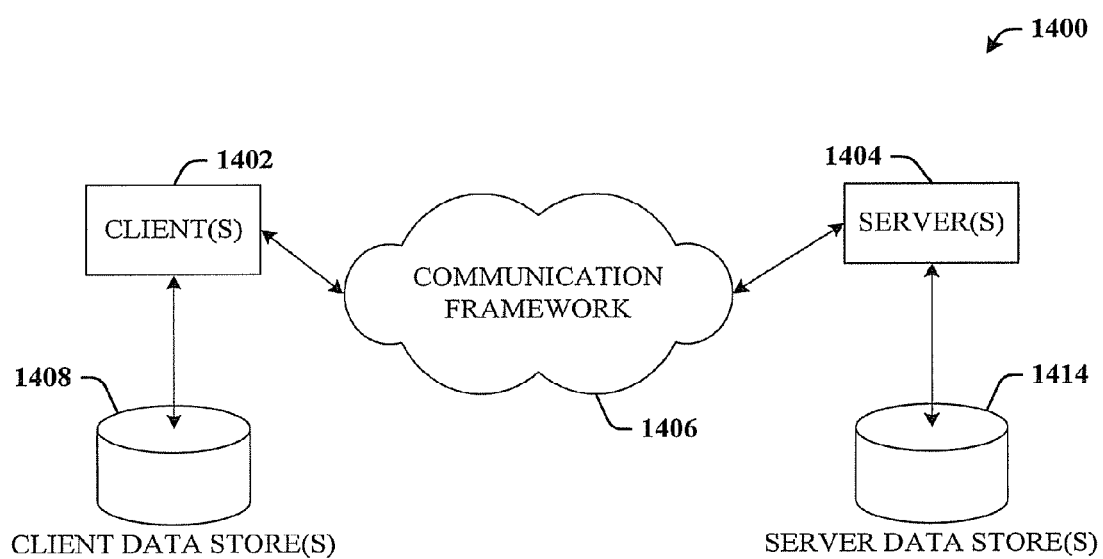
FIG. 14 illustrates a schematic block diagram of an exemplary computing environment.

Referring now to FIG. 14, there is illustrated a schematic block diagram of an exemplary computer compilation system operable to execute the disclosed architecture. The system 1400 includes one or more client(s) 1402. The client(s) 1402 can be hardware such as a digital camera with computer interface support and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes" or "include" are used in either the detailed description or the claims, such term is intended to be inclusive in a manner similar to the term "comprising" as "comprising" is interpreted when employed as a transitional word in a claim.

Having thus described the invention, what is claimed is:

1. A computer-implemented system that provides a scene having a ground-level, first-person perspective within a global map, the system comprising:
   a global map having a top-down perspective;
   a first image having a ground-level, first-person perspective and depicting a scene visible from a position within the extent of the global map, the scene including one or more objects located within the extent of the global map; and
   an interpolation component that embeds the first image in the global map to produce a hybrid map, the first image embedded in the global map at or near the position and oriented to accurately reflect the location of the one or more objects included in the scene and the perspective of the first image.

2. The system of claim 1, wherein the global map is an orthogonal map of a surface.

3. The system of claim 1, wherein the global map is a road map that emphasizes roads and omits other features physically present in the extent of the global map, and wherein the position is on or near a road within the extent of the global map.

4. The system of claim 1, wherein the interpolation component inserts the first image at or near the position oriented such that a perspective axis of the first image is aligned with a compass direction for the global map.

5. The system of claim 1, further comprising an intelligence component that determines at least one of: an orientation of the first image; a display style of the first image; and an importance of an object in the first image.

6. The system of claim 5, wherein the display style is at least one of parallel rectangles, trapezoidal shapes, two-dimensional representations, and three-dimensional representations.

7. The system of claim 5, wherein the object is at least one of emphasized and deemphasized based at least in part upon the importance of the object.

8. The system of claim 1, wherein the first image is a street-side image.

9. The system of claim 1, wherein the first image is a panorama image.

10. The system of claim 1, wherein the first image is a three-dimensional model.

11. The system of claim 1, wherein when embedded in the hybrid map, the first image includes a hyperlink to information associated with at least one of: the first image; an object included in the scene; and an object near the position.

12. The system of claim 1, further comprising:
one or more additional images, each additional image having a ground-level, first-person perspective and depicting a scene visible from a position within the extent of the global map, the scene including one or more objects located within the extent of the global map,
wherein for each additional image, the interpolation component embeds the image in the global map at or near the position from which the scene depicted in the image is visible, the image oriented to accurately reflect the location of the one or more objects included in the scene and the perspective of the additional image.

13. The system of claim 12, wherein the first image and the one or more additional images depict scenes visible from positions on or near a particular road within the extent of the global map.

14. The system of claim 12, wherein the first image and the one or more additional images depict scenes visible from positions on or near roads in a particular neighborhood or city district within the extent of the global map.

15. The system of claim 12, wherein the first image and each of the one or more additional images are oriented on the hybrid map based upon at least one of: alignment with the corresponding position; alignment with an object included in the corresponding scene; and alignment of a perspective axis with a compass direction of the global map.

16. The system of claim 12, wherein each of the one or more additional images depicts a scene including at least one object included in the scene depicted by the first image, the at least one object viewed from a different perspective in each additional image than in the first image.

17. The system of claim 16, wherein the hybrid map displays multiple perspectives of the at least one object in a single, printable representation.

18. A hybrid map that provides information about an object included in a scene visible from a position within the extent of a map, comprising:
a global, orthogonal perspective map having a top-down perspective; and
a first group of images depicting scenes visible from positions near a first object within the extent of the global map, the scenes each including the first object,
wherein each image in the first group of images shows the first object from a different ground-level, first-person perspective, and
wherein each image in the first group of images is embedded in the global map and oriented to accurately reflect the location of the first object and the perspective of the image.

19. The hybrid map of claim 18, further comprising:
one or more additional groups of images, each additional group depicting scenes visible from positions near an additional object within the extent of the global map, the scenes each including the additional object,
wherein each of the images in each additional group of images shows the corresponding additional object from a different ground-level, first-person perspective,
wherein each image in each additional group of images is embedded in the global map and oriented to accurately reflect the location of the corresponding additional object and the perspective of the image, and
wherein the first object and each additional object are displayed on the hybrid map from multiple perspectives simultaneously.

20. One or more computer storage media storing computer-executable instructions for performing a method for generating a hybrid map that provides street-side detail information and global map context, the method comprising:
receiving a street-side image depicting a scene from a position within the extent of a global, orthographic projection map, the scene including a corporeal object located within the extent of the global map, the street-side image having a ground-level, first-person perspective, and the global map having a top-down perspective;
determining the position from which the scene of the street-side image is depicted;
determining an orientation of the street-side image;
determining a display style for the street-side image; and
inserting the street-side image into the global map to create a hybrid map without a dominant perspective,
wherein the street-side image is displayed with the determined display style at the determined position and in the determined orientation.

* * * * *